United States Patent [19]

Yamakawa

[11] Patent Number: 4,769,755
[45] Date of Patent: Sep. 6, 1988

[54] SCINTILLATION CAMERA APPARATUS UTILIZING CONVERSION TIMING CONTROL

[75] Inventor: Tsutomu Yamakawa, Tochigi, Japan

[73] Assignee: Kabushiki Kaisha Toshiba, Kawasaki, Japan

[21] Appl. No.: 832,392

[22] Filed: Feb. 24, 1986

[30] Foreign Application Priority Data

Feb. 26, 1985 [JP] Japan ................................. 60-38043

[51] Int. Cl.⁴ .......................................... G01T 1/164
[52] U.S. Cl. ............................... 364/413.24; 307/269; 307/602
[58] Field of Search ................. 328/151; 307/353, 602, 307/269; 340/347.5 H; 358/905, 166, 167; 250/369; 364/414

[56] References Cited

U.S. PATENT DOCUMENTS 4,345,241  8/1982  Takeuchi ................. 340/347 SH
4,626,716  1/1985  Miki ........................... 307/602

FOREIGN PATENT DOCUMENTS 0117299  5/1984  European Pat. Off. ............ 250/369

Primary Examiner—Jerry Smith
Assistant Examiner—Gail O. Hayes
Attorney, Agent, or Firm—Finnegan, Henderson, Farabow, Garrett and Dunner

[57] ABSTRACT

A scintillation camera apparatus includes a conversion timing control circuit and a plurality of signal processing channels. The signal processing channels includes a plurality of A/D converters. The A/D conversion periods are not overlapped with each other under the control of the conversion timing control circuit.

8 Claims, 4 Drawing Sheets

F I G. 4
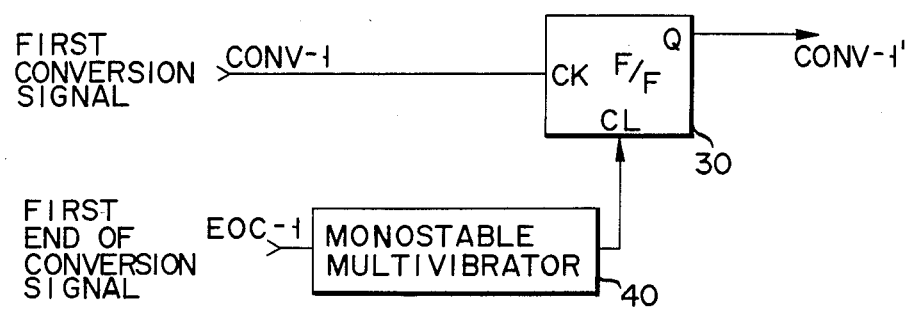
F I G. 5
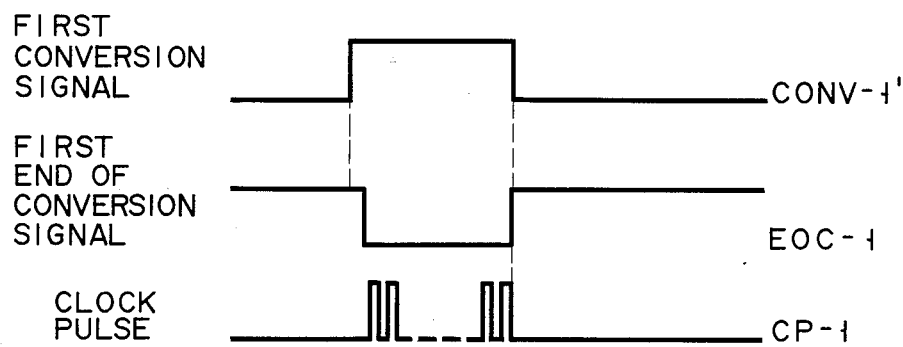

SCINTILLATION CAMERA APPARATUS UTILIZING CONVERSION TIMING CONTROL

BACKGROUND OF THE INVENTION

1. Field of the Invention:

The invention relates to a scintillation camera apparatus, and more particularly, to a timing control circuit for analog-to-digital converters in the scintillation camera.

2. Description of the Prior Art

A scintillation camera apparatus is extensively known as an apparatus for administering radio isotopes in an object under medical examination and causing a scintillation detector to detect radiation (gamma rays) emitted from radio isotopes selectively concentrated in a specific internal organ, thereby performing medical diagnosis.

A known scintillation camera apparatus of this type includes three signal processing circuits. These signal processing circuits have functions for independently processing X- and Y-positional signals, representing two-dimensional x- and y-coordinate position data, and an energy signal (i.e., an energy signal of incident photons) at a position specified by x and y. These three signals are generated by the scintillation detector. Each signal processing circuit includes a sample and hold circuit for performing sampling and holding, and an A/D converter for converting a sampled analog signal to digital data.

These independent signal processing circuits independently process three different signals, i.e., the X-positional signal, the Y-positional signal and the Z (energy) signal. The operation timings of these three signal processing circuits are substantially identical. Therefore, changes, or fluctuations in drive currents flowing between the ground line and lines connected to the respective sample and holding circuits and A/D converters in the respective signal processing circuits are different from each other. The following drawbacks are thus introduced.

When a plurality of signal processing systems are simultaneously driven, noise periodically appears in the resultant image along the X-Y direction, thus adversely affecting clinical diagnosis.

Problems caused by the differential linearity error in A/D converters are generally present in conventional scintillation cameras. In addition, the noise problems described above are also introduced.

As for the latter problems, a problem caused by the A/D converter itself and a problem caused by interference between a plurality of signal processing systems including sample and hold means and series-connected A/D converting means are recognized.

It is an object of the present invention to provide a scintillation camera apparatus which can reduce adverse effects of interference, particularly between A/D converters in the respective signal processing channels, and prevent noises to be superimposed on the image, thereby producing an image for high-precision diagnosis.

SUMMARY OF THE INVENTION

The object of the invention can be accomplished by providing a scintillation camera apparatus comprising means for detecting radiation containing radiation information of an object under examination to derive a radiation information signal, a plurality of signal processing channels including at least a plurality of analog-to-digital (A/D) converters, for independently processing the radiation information signal in the respective signal processing channels so as to derive a plurality of radiation information data, means for performing calculations necessary for diagnosis to the radiation information data, and means for controlling conversion starting instants of said plurality of A/D converters not to simultaneously drive said plurality of A/D converters.

BRIEF DESCRIPTION OF THE DRAWINGS

For a better understanding of the above object and features of the invention, reference is made to the following detailed description of the invention to be read in conjunction with the following drawings, in which:

FIG. 4 is a schematic block diagram of the timing controller according to the second preferred embodiment;

FIG. 5 shows a timing chart of the interruption of the clock pulse for the A/D converter;

DETAILED DESCRIPTION OF THE PREFERRED EMBODIMENTS

First Conversion Mode

Figure 1:
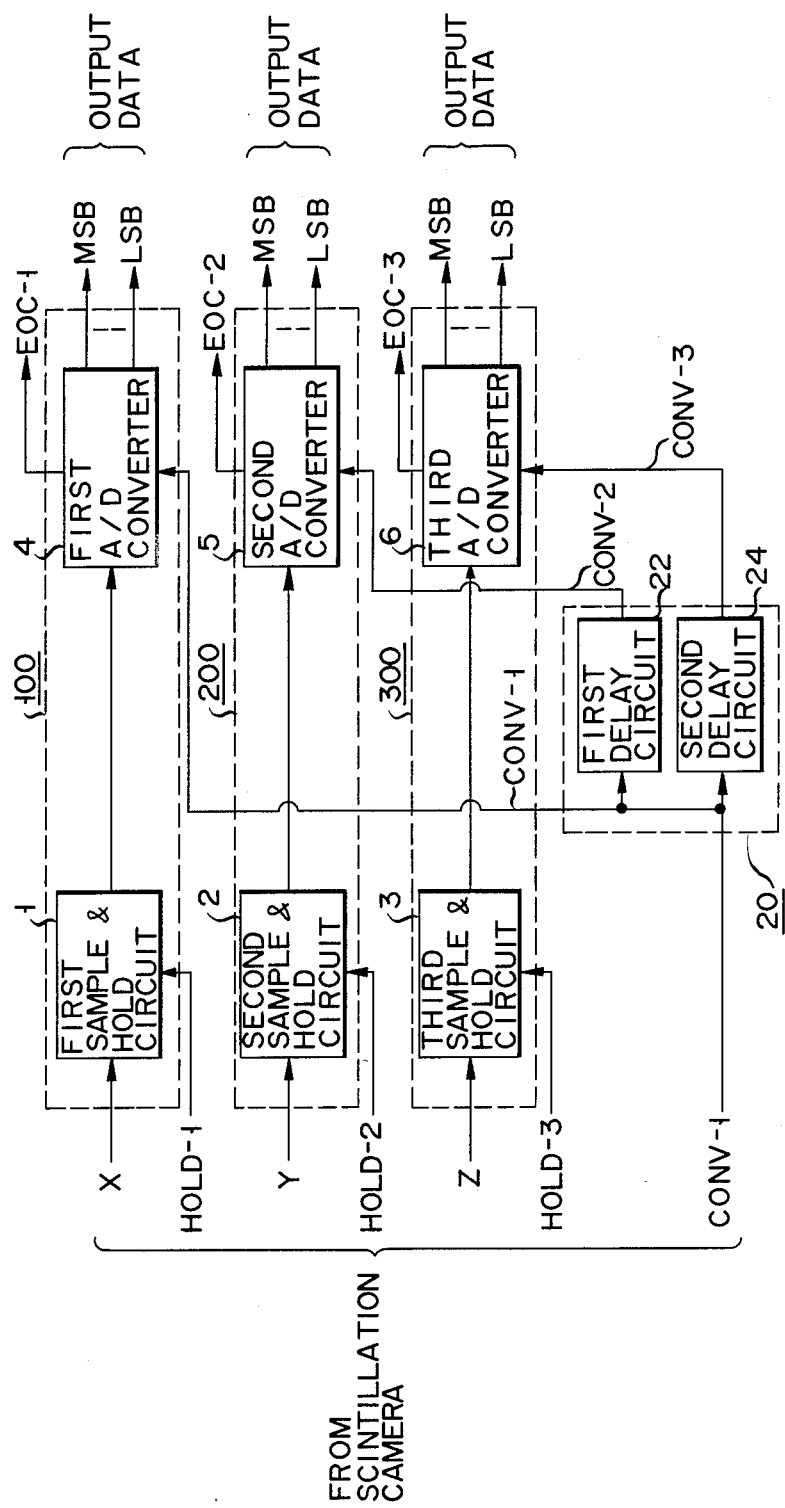
FIG. 1 is a schematic block diagram of the major circuit of the scintillation camera apparatus according to the first preferred embodiment.

In FIG. 1, there is shown a major circuit of a scintillation camera apparatus according to a first preferred embodiment of the invention. This circuit is mainly constructed by an X-positional signal processing channel 100, a Y-positional signal channel 200, a Z-energy signal processing channel 300 and a timing control circuit 20. These X and Y positional signals and Z energy signal (i.e., an energy signal of incident photons) are derived from a scintillation camera (not shown in detail). The timing control circuit 20 includes a first delay circuit 22 and a second delay circuit 24. This timing control circuit receives a first conversion signal CONV-1 and then derives three different conversion signals, i.e., the first conversion signal CONV-1, a second conversion signal CONV-2 and a third conversion signal CONV-3.

Timing control circuit 20 also includes a delay circuit 22 for delaying signal CONV-1 by a first predetermined delay time, and a delay circuit 24 for delaying signal CONV-1 by a second predetermined delay time. Delay circuits 22 and 24 generate second and third conversion signals CONV-2 and CONV-3 with respective leading edges delayed by the first and second predetermined delay times, and details thereof will be described later.

Figure 2:
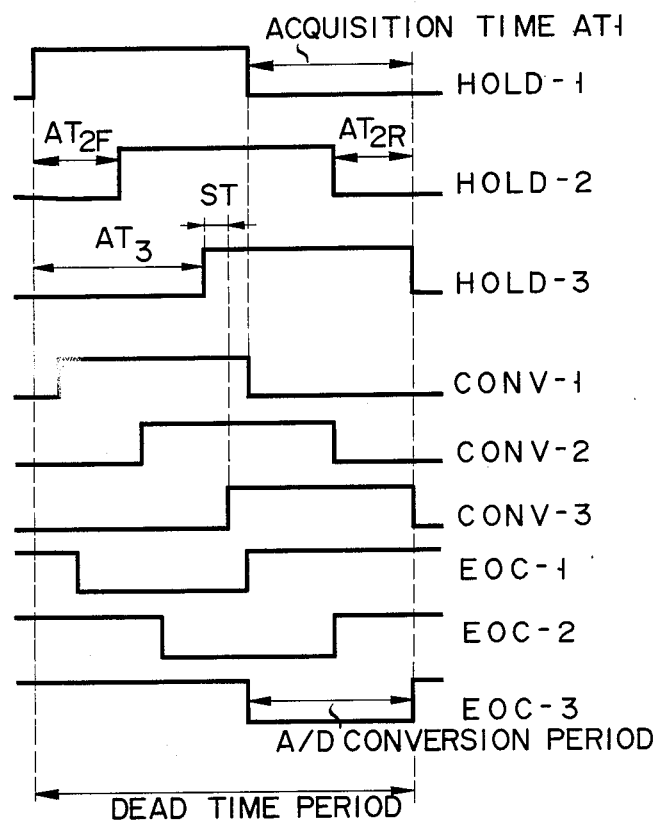
FIG. 2 shows a timing chart of the A/D conversion of the circuit shown in FIG. 1.

The operation timings will be defined with reference to the timing chart in FIG. 2 before the operation of the scintillation camera apparatus in FIG. 1 is described.

In signal processing channel 300, third control signal HOLD-3 is supplied to third sample and hold circuit 3. Third conversion signal CONV-3 is supplied to third A/D converter 6 a predetermined settling time after the rising instant of signal HOLD-3. This settling time is preset according to a buffer time required for stabilizing the sampling operation. Upon reception of signal CONV-3, this A/D converter 6 starts its A/D conversion. When a predetermined period of time has elasped, it generates an end of conversion signal EOC-3 and then completes A/D conversion. As seen from FIG. 2, acquisition time $AT_3$ for the previous conversion period is set in front of the setting time. Although acquisition time for this conversion period is set immediately after the falling edge of signal HOLD-3, no indication is made in FIG. 2. During this period, the sample and hold function of the next cycle can be performed. Therefore, a dead time period is defined by the time period from the rising (leading) edge of the first control signal HOLD-1 up to the rising (leading) edge of the third end of conversion signal EOC-3. The dead time period determines the counting rate characteristics of the scintillation camera.

In the scintillation camera apparatus including the circuit arrangement described above, both second and third control signals CONV-2 and CONV-3 delayed by the first and second delay times from the first control signal CONV-1, as shown in FIG. 2, are supplied to the second and third converters 5 and 6, respectively. As is apparent from these end of conversion signals EOC-1 to EOC-3, the A/D conversion start timings of three A/D converters 4, 5 and 6 are different from each other. The different timings prevent portions of A/D conversion operations in converters 4 and 6 from being superimposed under the control of timing control circuit 20. With such different A/D conversion timings, outputs X, Y and Z from sample and hold circuits 1, 2 and 3 are independently A/D-converted to mitigate interferences between circuits 1 to 3 and converters 4 to 6 in the three signal processing channels 100 to 300, thereby greatly decreasing noises in the resultant image as previously described.

The present inventor conducted a test by operating three successive approximation type A/D converting devices, at simultaneous timings. Since the operation of the A/D converting devices was synchronized with each other and basic clocks in the A/D converting devices were also synchronized with each other, changes, or fluctuations in currents flowing through power source lines and the ground lines were doubled. A small difference in impedance between the signal line and the ground line adversely affected timing signals in the A/D converting devices and hold signals in the sample and hold devices. In addition, successive approximation precision was degraded by noises superposed on the image in the same manner as with differential linearity error. Such problems occur particularly often during A/D conversion.

More specifically, when a plurality of A/D converters are simultaneously driven, the respective internal clock circuits oscillate simultaneously. It is known, however, that clock phases are very slightly shifted at lower bit data determination timings in A/D conversion due to small time differences such as differences in duty cycle and conversion time.

As the A/D conversion operation progresses to the lower bit data determination timings, comparator timings of the respective A/D converters are shifted accordingly.

If each A/D converter is, for example, a 12-bit successive approximation type A/D converter with a 1.5 micro-seconds conversion time, the oscillation frequency of the internal clock circuit is a high frequency of about 8 MHz. As a result, when data at the leading and trailing edges of the clock and the last determination data are latched by a successive approximation register, a considerably large spike current flows through the power source (+VDD) and the digital common. When grounding (with a proper ground connection) of each A/D converter or between the respective A/D converters is not properly performed, a spike voltage (i.e, spike noise) appears due to the ground impedance and spike currents. When spike noise generation timing coincides with the output data determination timing of the comparator, a false operation can occur in the comparator. In the conventional apparatus, interference occurs due to spike noises.

Referring back to FIGS. 1 and 2, a timing control operation as the major feature of the present invention will be described hereinafter.

The first to third control (starting) signals HOLD-1 to HOLD-3 are supplied to corresponding first to third sample and hold circuits 1 to 3 in the phase shift state as shown in FIG. 2.

The first conversion signal CONV-1 is supplied directly (i.e., without any delay) to the control terminal of the first A/D converter 4. At the same time, this control signal CONV-1 is supplied to timing control circuit 20 to generate the second and third conversion signals CONV-2 and CONV-3 delayed by the first and second predetermined delay times from the first conversion signal CONV-1. Thus, these second and third conversion signals CONV-2 and CONV-3 are supplied to the second and third A/D converters 5 and 6, respectively. The operation timings of the first to third converters 4, 5 and 6 are shifted as shown in FIG. 2 to buffer fluctuations in currents flowing through the power source lines and ground lines (not shown in detail). According to the present invention, although impedances between the signal lines and ground lines vary slightly, the timing signals in the first to third A/D converters 4 and 6 do not substantially adversely affect the sample and hold signals in the first to third sample and hold circuits 1 to 3. In addition, the degradation of successive approximation precision can be substantially avoided. Therefore, substantially no noise is superimposed on the resultant image.

Operation is performed using output data from converters 4, 5 and 6 from most to least significant bits (MSB, LSB) to display an image for diagnosis in the same manner as in a conventional apparatus, and a detailed description thereof will be omitted.

Second Conversion Mode

Figure 3:
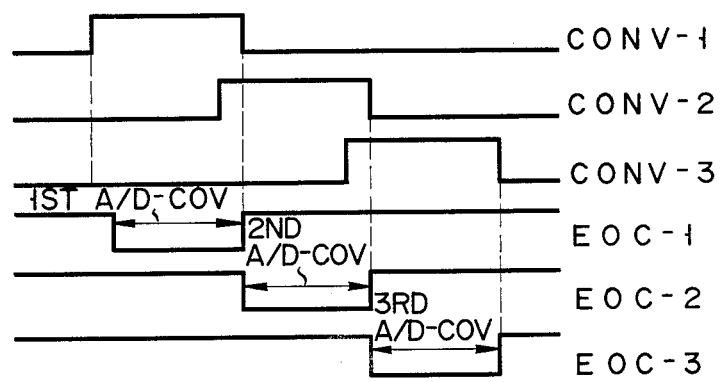
FIG. 3 shows a timing chart of the A/D conversion according to the second conversion mode.

In the first conversion mode described above, portions of the A/D conversion operations in the first and second A/D converters 4 and 5 and the second and third A/D converters 5 and 6 overlap, as shown in FIG. 2. According to the invention, the first and second predetermined delay times of delay circuits 22 and 24 in circuit 20 can be increased. That is, the overlapping portions between the first to third end of conversion signals EOC-1 to EOC-3 are completely eliminated, and thus, the operation timings of converters 4, 5 and 6 are completely offset, as shown in FIG. 3. With this setting, superimposition of noise on the resultant image can be further avoided.

For the sake of simplicity, the first to third control signals HOLD-1 to HOLD-3 for the first to third sample and hold circuits 1 to 3 are omitted.

In this second A/D conversion mode, overlappings of the A/D conversions of converters 4, 5 and 6 are completely eliminated by controlling the delay times of timing control circuit 20. Alternatively, the phases of the basic clocks of converters 4, 5 and 6 are shifted by 120° apart from each other to realize the second A/D conversion mode. 120° shifting of the basic clocks is known to those skilled in the art, and a detailed description thereof will be omitted.

Other Conversion Modes

Normally, the basic clocks for A/D conversion are being supplied to the A/D converter even outside of the A/D conversion period. The basic clocks can be stopped during the period outside the A/D conversion period to prevent interference between the signal processing channels. FIG. 4 shows a control circuit for interrupting the supply of these basic clocks during the period outside the A/D conversion period. This control circuit includes a flip-flop 30 and a monostable multivibrator 40. First conversion signal CONV-1 of FIG. 1 is supplied to a clock input terminal CK of flip-flop 30. An output from output terminal Q of flip-flop 30 is supplied as first conversion signal CONV-1 to first A/D converter 4 in FIG. 1. A first end of conversion signal EOC-1 from first A/D converter 4 is supplied to a clear terminal CL of flip-flop 30 through monostable multivibrator 40.

The same circuits as described above are arranged respectively for second and third A/D converters 5 and 6.

With this circuit arrangement, a pulse (not shown in detail) having a predetermined pulse width is generated by monostable multivibrator 40 at the leading edge of the first end of conversion signal EOC-1. This signal EOC-1 clears flip-flop 30, so that the first conversion signal CONV-1 goes down at the leading edge of signal EOC-1, thereby stopping the supply of basic clock CP-1.

The same operation as described above can be performed for the other conversion signals CONV-2 and CONV-3. This control circuit is not limited to be used in the circuit arrangement in FIG. 1, but can also be applied to the circuit arrangement causing the timing control circuit 20 to shift the first, second and third basic clocks by 120°.

In the first and second A/D conversion modes described above, the conversion time (i.e., the dead time period) of the X- and Y-positional signals and Z-energy signal from the scintillation camera (not shown) is slightly longer than that in a conventional apparatus. For this reason, counting rate characteristics of the scintillation camera are deteriorated. Such a problem can be avoided with the following circuit arrangement.

For example, an input unblank signal is buffered by a buffer circuit (not shown) to obtain a minimum unblank-/unblank interval value calculated with a maximum counting rate represented by the basic characteristics of the scintillation camera. The input unblank signal is stretched to maximum period $T_{MAX}$. Since output from the scintillation detector is random, no problem occurs even if the interval of the input unblank signal is slightly prolonged.

Figure 6:
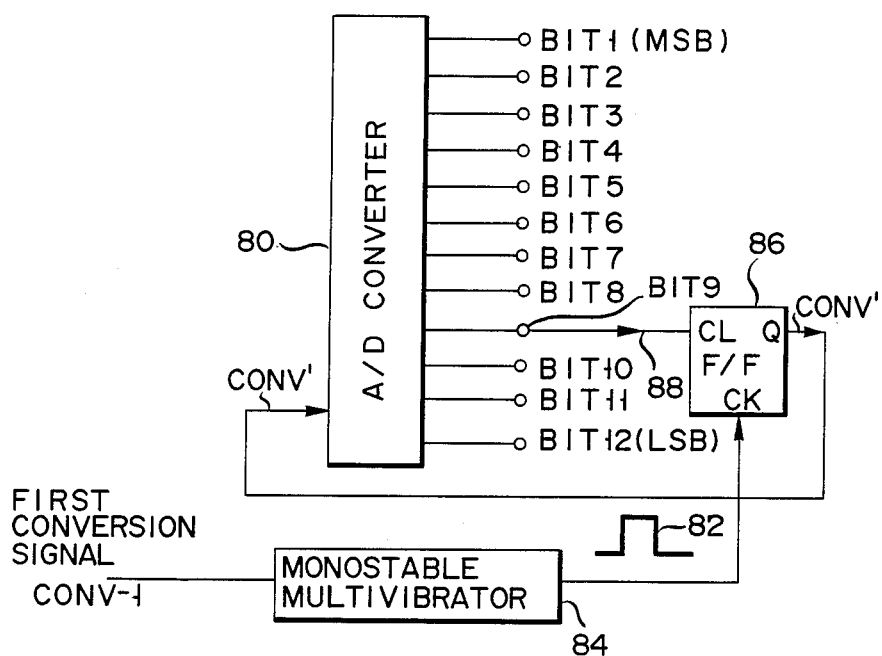
FIG. 6 is a schematic block diagram of the 12-bit A/D converter utilizing the clock pulse interruption.

As shown in FIG. 6, a 12-bit A/D converter 80 is used in place of first to third A/D converters 4, 5 and 6 in FIG. 1. Pulse signal 82 having a predetermined pulse width is generated by monostable multivibrator 84 at the leading edges of first to third conversion signals CONV-1 to CONV-3. Signal 82 is supplied to the clock terminal CK of flip-flop 86. An output from flip-flop 86 is supplied as a new conversion signal CONV' to A/D converter 80. A/D conversion starts at the leading edge of this conversion signal CONV' (corresponding to the leading edge of signal CONV-1). Conversion identification signal 88 of bit-9 derived from A/D converter 80 clears flip-flop 86. The conversion signal CONV' output from flip-flop 86 is forcibly set at low level, thereby accomplishing A/D conversion.

Figure 7:
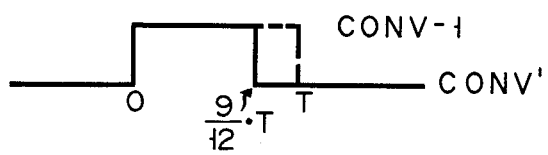
FIG. 7 schematically shows the conversion signal produced in the circuit shown in FIG. 6.

According to the operation described above, the conversion signal CONV' is shortened to 9/12 of the original conversion signal CONV-1, as shown in FIG. 7, thereby shortening the dead time period to 9/12 and hence preventing degradation of the counting rate characteristics.

A high speed 12-bit A/D converter Model No. ADC803 commercially available from Burr-Brown Corporation was employed as the A/D converter in FIG. 6. This A/D converter is a successive approximation type A/D converter. In this converter, a conversion command is generated and at the same time a clock circuit starts oscillation. In synchronism with these, the input signal level is compared with the internal D/A converter output from the MSB (Bit-1) to LSB (Bit-12), and determination data is finally latched by an SAR (Successive Approximation Register).

In summary, according to the present invention, in a scintillation camera apparatus employing a scintillation detector for detecting radiation information emitted from an object under medical examination, and a plurality of separate signal processing channels including a plurality of A/D converting means for converting radiation information detected by the scintillation detector into digital data to be processed for diagnosis, there is provided a timing control means for shifting the operation timings of the A/D converting means in the plurality of signal processing channels or shifting the timings of the basic clocks.

Interference particularly between the A/D converting means in the respective signal processing channels, therefore, can be avoided, and thus superposition of noise on the image can be prevented. As a result, a better quality image can be provided for diagnosis.

What is claimed is:

1. A scintillation camera apparatus comprising:
   means for detecting radiation containing radiation information relating to diagnosis of an object under examination to derive a radiation information signal;
   a plurality of signal processing channels, each of said channels including at least one analog-to-digital converter each having a conversion starting instants and conversion operation periods, for independently processing the radiation information signal in respective signal processing channels to derive radiation information data;
   means for controlling the conversion starting instants for each of said A/D converters for operating a single processing channel at any one time to convert the respective information signal; and
   means for processing the radiation information data from the A/D converters to obtain the diagnosis information.

2. The apparatus as claimed in claim 1, wherein the controlling means includes means for generating clock pulses, each said A/D converter having means responsive to said clock pulses to start conversion and wherein said control means interrupts the clock pulses for each of said A/D converters to control the conversion starting instants of said A/D converters.

3. The apparatus as claimed in claim 2, wherein said control means includes:
   a flip-flop and a monostable multivibrator for interrupting an application of said clock pulses to said A/D converters.

4. The apparatus as claimed in claim 2, wherein said clock pulses for one of said A/D converters are shifted by 120 degrees with respect to the clock pluses for other A/D converters.

5. The apparatus as claimed in claim 1, wherein each of the radiation information signals contains first and second position signals representative of first and second positions in two dimensions, respectively, of the detected radiation, and a third detected radiation energy signal, and wherein said plurality of A/D converters are comprised of first and second A/D converters for respectively converting the first and second two-dimensional position signals contained in the radiation information signal into corresponding first and second position information data, and of a third A/D converter for converting the radiation energy signal contained in the radiation information signal into corresponding third energy information data.

6. The apparatus as contained in claim 1, wherein said controlling means includes first and second delay circuits having first and second delay times respectively.

7. The apparatus as claimed in claim 1, wherein each of the signal processing channels comprise:
   a plurality of sample and hold circuits, each of which is series-connected to one of said plurality of A/D converter in the respective signal processing channels.

8. The apparatus as claimed in claim 1, wherein said signal processing channels further include a flip-flop and a monostable multivibrator for compulsorily preventing the starting of the conversions performed by each said A/D converter.

* * * * *